(12) United States Patent
Sriram et al.

(10) Patent No.: US 10,033,783 B1
(45) Date of Patent: Jul. 24, 2018

(54) TRACKING MEDIA CONSUMPTION

(75) Inventors: Siddharth Sriram, Seattle, WA (US); James Marvin Freeman, II, Seattle, WA (US); Michael Janusz Pawliszyn, Seattle, WA (US); Abhishek Prasad, Sammamish, WA (US); Kamlesh T. Talreja, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1177 days.

(21) Appl. No.: 12/909,210

(22) Filed: Oct. 21, 2010

(51) Int. Cl.
*G06Q 10/00* (2012.01)
*H04L 29/06* (2006.01)

(52) U.S. Cl.
CPC ............. *H04L 65/60* (2013.01); *G06Q 10/00* (2013.01)

(58) Field of Classification Search
CPC .................................................. G06Q 20/135
See application file for complete search history.

(56) References Cited

U.S. PATENT DOCUMENTS

| | | | | |
|---|---|---|---|---|
| 8,131,645 B2* | 3/2012 | Lin et al. | | 705/51 |
| 9,124,650 B2* | 9/2015 | Maharajh | | G06F 21/10 |
| 9,197,684 B2* | 11/2015 | Todd | | H04L 43/0852 |
| 9,733,809 B1* | 8/2017 | Greene | | G06F 3/0484 |
| 2005/0108176 A1* | 5/2005 | Jarol et al. | | 705/59 |
| 2006/0248014 A1* | 11/2006 | Belzer | | 705/51 |
| 2009/0138346 A1* | 5/2009 | Kalaboukis et al. | | 705/14 |
| 2010/0269145 A1* | 10/2010 | Ingrassia et al. | | 725/110 |

* cited by examiner

*Primary Examiner* — Bruce I Ebersman
(74) *Attorney, Agent, or Firm* — Thomas | Horstemeyer, LLP (57) ABSTRACT

Disclosed are various embodiments for tracking media consumption by multiple devices. On a computing device, a first media consumption report is received. The first media consumption report is associated with a media title on a first client device. The first client device is registered by a user. A rights windows in a license associated with the media title is reconciled with the first media consumption report. Responsive to the reconciling, the reconciled license is propagated to the first client device.

13 Claims, 5 Drawing Sheets

TRACKING MEDIA CONSUMPTION

BACKGROUND

Various systems exist which allow media titles to be downloaded over a network to a device and consumed later on that device. Some of these systems use a digital license which is included with the download, where the digital license allows a user to consume the media title for a limited period of time, for example, any 24 hour period in the 30 days after download. Users may wish to consume the media title on multiple devices, and some of these devices may be offline for periods of time.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to media consumption, or playback, on multiple devices associated with a particular user. Users employ devices to download media titles for later consumption. Consumption of a particular media title is reported by the various devices to a central location. The central location processes the consumption information from each of the devices and informs the other devices about the consumption.

An example scenario involves two client devices which have downloaded a media title and a license for that title. In this scenario, a user plays back the media title on one device for a period of time, e.g., 45 minutes. As part of the playback, the device reports this consumption to a server. The server then reconciles the 45 minute consumption provided in the report with the master license on the server, by comparing the start time in the report with the rights window in the license. If the start time in the report is earlier than the rights window, the rights window is updated to reflect the client device's start time.

In this scenario, the same client device is used to play back the title a second time. As part of the playback, the client device requests the server to validate the license. During the license validation, the server determines that the rights window in the master license is different than the rights window in the license on the client (as a result of the first playback). In response to this determination, the server provides an updated license to the client, which may be done as a response to the validation request.

Continuing with this scenario, another client device is used to play back the same title, but for a shorter period of time (30 minutes). However, this second client device can not contact the server at the time of playback, e.g., because the client device is offline, no network access is available, etc. Although the license cannot be validated, the offline client device is nonetheless allowed to play back the title. As before, the client device stores consumption events, but queues the events instead of reporting to the server. At some later point in time, the client device successfully contacts the server, and reports the queued consumption events.

In addition to reporting the queued events, the second client device also requests the server to validate the license. Since the first client device has partially consumed the title (for 45 minutes) but that consumption occurred while the second client device was offline, the validation has several results. One result is that the server determines that the consumption time for the second client (30 minutes) was less than the first client (45 minutes). Since the license was already reconciled to account for 45 minutes, there is no need to reconcile to account for the shorter time of 30 minutes. Another result is that the license for the second client device—the one that requested validation—should be updated to account for the 45 minute consumption by the first client device. In response to the validation request, the server provides this updated license. At this point in time, both clients have a license which is synchronized with the master copy on the server.

The reconciling of the rights window and the consumption reports may also indicate that a client has already consumed the media title outside the rights window. The server then performs a payment transaction with the licensor to account for the discrepancy between the original license and the behavior of the media consuming devices. Having described a particular usage scenario, client and server operation will now be described.

Figure 1:
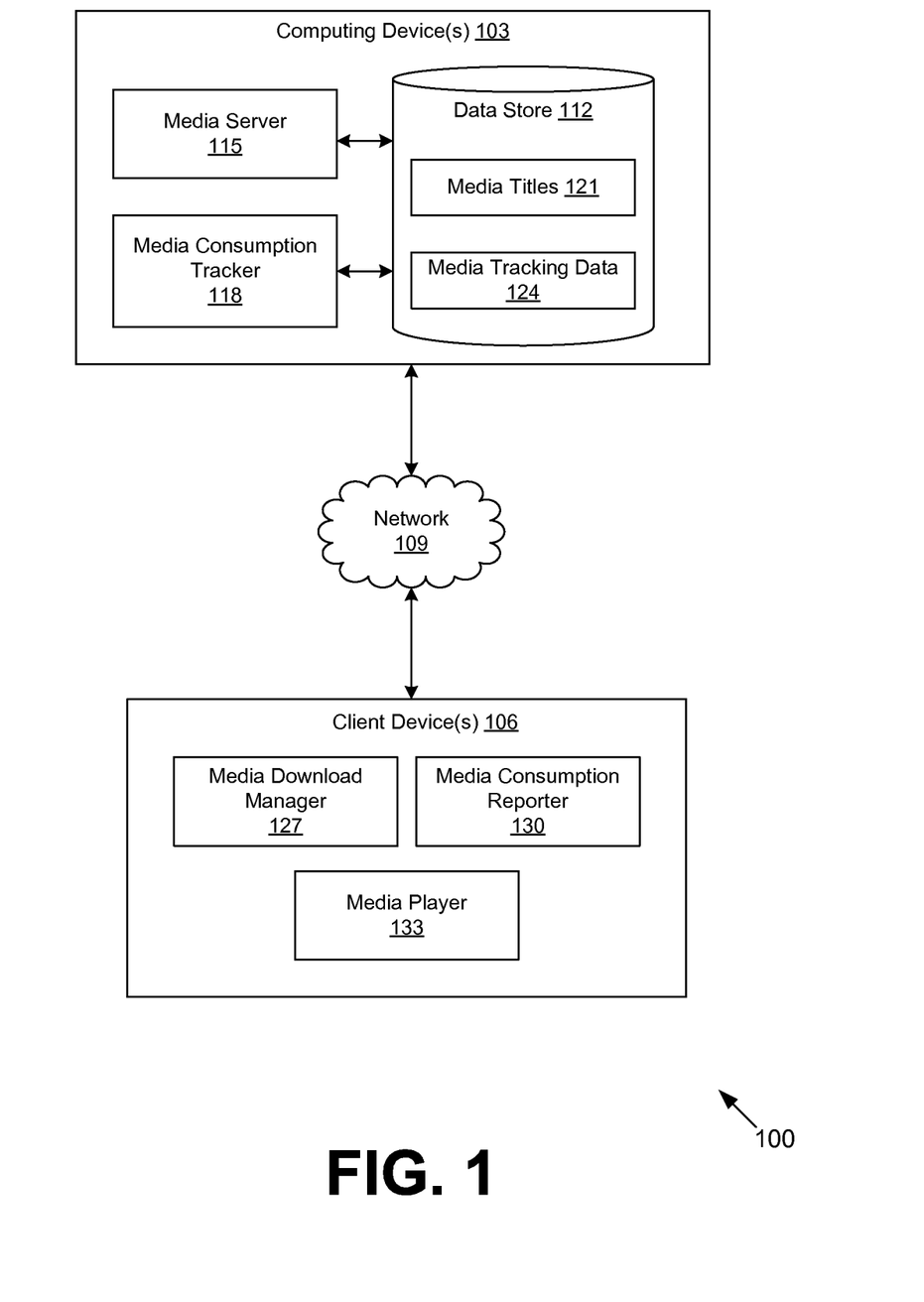
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more client devices 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below.

The components executed on the computing device 103, for example, include a media server 115, and a media consumption tracker 118. The components executed on the computing device 103 may also include other applications, services, processes, systems, engines, or functionality not discussed in detail herein. The data stored in the data store 112 includes, for example, media titles 121 accessed by the media server 115, media tracking data 124 used by the media consumption tracker 118, and potentially other data.

The media server 115 is executed to provide media title(s) 121 to client devices 106, along with a user license(s) for these titles. The media consumption tracker 118 is executed to receive media consumption reports from client devices 106 and to provide these reports to the media server 115. The media server 115 uses these consumption reports to update user licenses.

In various embodiments, the media server 115 and the media consumption tracker 118 may utilize any type of middleware framework to communicate with a client application executing on a client device 106. Examples of such frameworks include remote procedure calls, service-oriented architecture protocol (SOAP), representational state transfer (REST), and other frameworks. Although illustrated in FIG. 1 as residing on the same computing device 103, media server 115 and the media consumption tracker 118 may reside on separate computing devices, as will be appreciated.

The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a set-top box, a music player, a video player, a media player, a web pad, a tablet computer system, a game console, or other devices with like capability.

The client device 106 may be configured to execute various applications such as a media download manager 127, a media consumption reporter 130, a media player 133, and/or other applications. The media download manager 127 may be executed in the client device 106 to download media titles over the network 109. The media player 133 may be executed in the client device 106 to play back downloaded media titles. These media titles may include, for example, audio content, video content and/or audio/video content. The media consumption reporter 130 may be executed in the client device 106 to monitor playback of media titles and to report playback events to the media consumption tracker 118 executing on the computing device 103. The client device 106 may be configured to execute other applications such as, for example, email applications, instant message applications and/or other applications.

Next, a general description of the operation of the various components of the networked environment 100 is provided. To begin, the media download manager 127 executing on a client device 106 requests a media title 121 from the media server 115 executing on a computing device 103. Before fulfilling the request, the media server 115 may authenticate the user, for example, via a login process. The download process may also involve a payment transaction, as should be appreciated. Also, the media server 115 may authenticate one or more client devices 106 associated with the user.

Once the preliminary requirements are taken care of, the media server 115 sends the requested media title 121 to the media download manager 127. The media server 115 may retrieve the media title 121 from the data store 112, or may instead direct the data store 112 to transmit the media title 121 to the media download manager 127.

As part of the download process, a license for the media title 121 is sent to the media download manager 127. The license describes how long the user has to play back (consume) the title. These parameters may include a total period and a once-started period. For example, the license may give the user access to the title for a total of 30 days, but once playback is started, the user has 24 hours to complete the playback. This license may be enforced by the media download manager 127 on the client device 106.

At some point after the media title 121 is downloaded, the user begins playback of the title using the media player 133. The media consumption reporter 130 monitors playback events and stores information such as the type of the event and the time of the event.

The media consumption reporter 130 sends a media consumption report to the media consumption tracker 118 executing on the computing device 103. The report identifies the client device 106 and the media title 121 and also includes the previously stored event information. In some embodiments, the report includes a playback start time and a duration, or a playback start time and a playback stop time.

The media consumption tracker 118 receives these media consumption reports from multiple client devices and uses this information to reconcile media consumption on these multiple client devices with a master copy of the user's license for the media title 121, managed by the media consumption tracker 118. More specifically, when the report indicates that a particular user has consumed (at least in part) a media title 121, the media server 115 updates the license for that title to reflect the consumption. For example, a report that a user has started playback and that three hours have elapsed since that start results in the once-started period being reduced by three hours (e.g., from 24 to 21).

If the events in the report indicate that the client device already has the most recently updated license, the license is not updated. If the license is updated, the media server 115 sends the updated license to those client devices 106 associated with the user which have downloaded the title.

Figure 2:
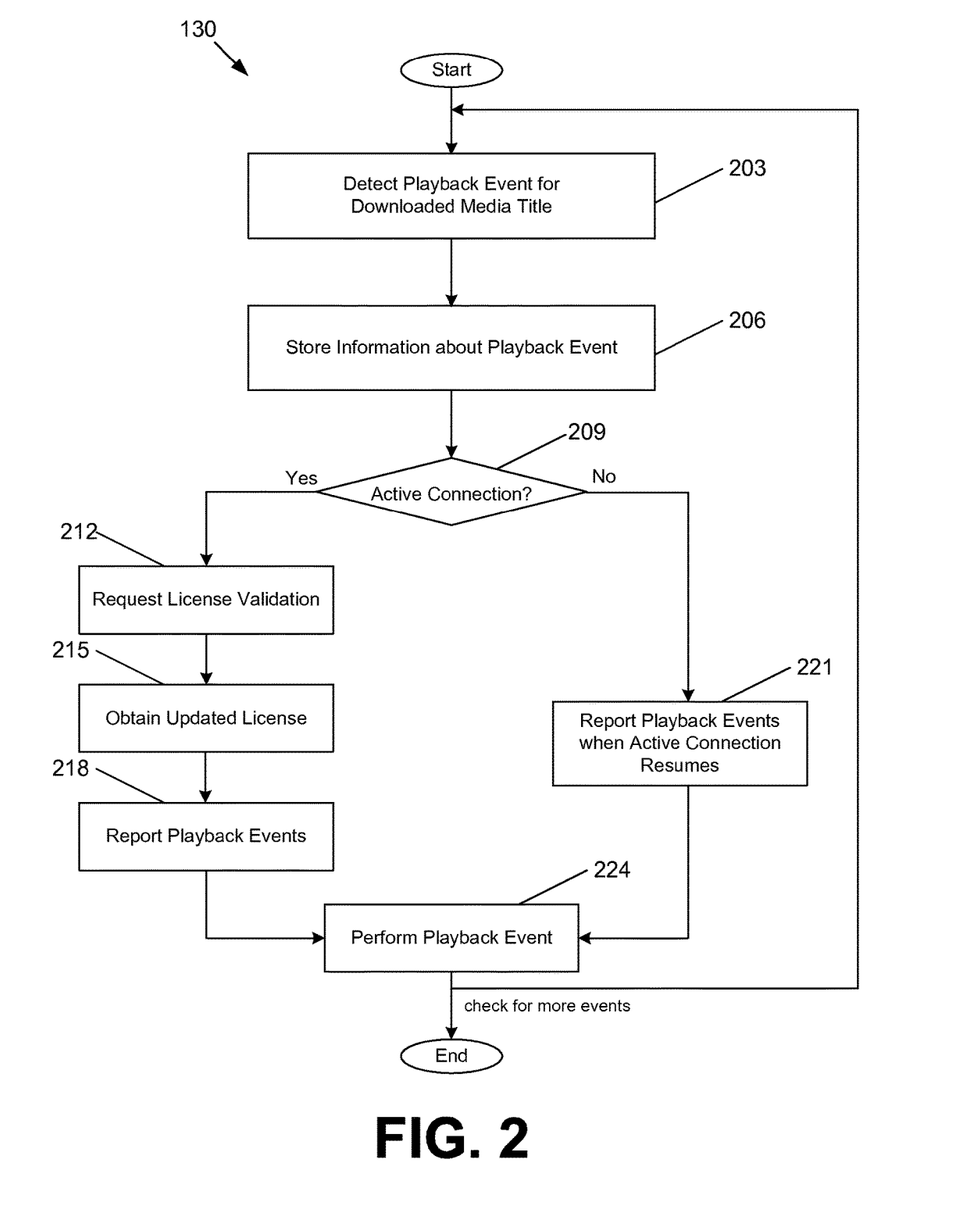
FIG. 2 is a flowchart illustrating one example of functionality implemented as portions of a media consumption reporter application executed in a client device in the networked environment of FIG. 1 according to various embodiments of the present disclosure.

Referring next to FIG. 2, shown is a flowchart that provides one example of the operation of a portion of the media consumption reporter 130 according to various embodiments. It is understood that the flowchart of FIG. 2 provides merely an example of the many different types of functional arrangements that may be employed to implement the operation of the portion of the media consumption reporter 130 as described herein. As an alternative, the flowchart of FIG. 2 may be viewed as depicting an example of steps of a method implemented in the client device 106 (FIG. 1) according to one or more embodiments.

Beginning at box 203, the media consumption reporter 130 detects at least one playback event for a downloaded media title. The detected events include play and stop, and may also include pause, skip, fast-forward, rewind, etc. Next, at box 206, the media consumption reporter 130 stores information about the playback event, such as a time at which the event occurred, a media title identifier, an account identifier, etc. At box 209, the media consumption reporter 130 determines whether client device 106 has an active connection to the network 109 (FIG. 1). If, at box 209 it is determined that an active connection exists, the media consumption reporter 130 moves to box 212. If it is determined instead that an active connection does not exist, the media consumption reporter 130 moves to box 221. Determination of an active connection may be accomplished in various ways, as should be appreciated. The media consumption reporter 130 may, for example, query a network device driver or a protocol stack. In configurations where the client device 106 communicates with the network 109 through a local area network (LAN), e.g., an 802.11 wireless LAN, it may be the case that the LAN has no active connection to the network 109 even though the client device 106 has an active connection to the LAN. In such cases, box 209 would determine that no active connection is present.

At box 212, having determined that an active connection exists, the media consumption reporter 130 requests license validation from the media consumption tracker 118 (FIG. 1) executing on the computing device 103. The media consumption reporter 130 provides a locally stored license, or information about the locally stored license, to the media consumption tracker 118. The media consumption tracker determines whether the license is valid for playback on the client device 106 at the current time, or whether the license has instead expired. At box 215, the media consumption reporter 130 obtains an updated license if the validation indicates that an update is needed. Next, at box 218 the media consumption report 130 reports at least a portion of the stored playback event(s) to the media consumption tracker 118 executing on the computing device 103.

If at box 215, it is determined that no active connection exists, processing continues at box 221. At box 221, the media consumption reporter 130 waits until an active connection is re-established to report at least a portion of the stored playback event(s) to the media consumption tracker 118.

Regardless of whether an active connection exists, the playback event which was detected at box 203 is performed at box 224. In this manner, the client device 106 is allowed to play back the downloaded media title even if the license has expired. As will be explained below, the media consumption tracker 118 executing on the computing device 103 may make a payment to the licensor to account for playback during the expired period.

The report provided at box 212 or box 215 includes various identifiers such as media title, account and/or device. In some embodiments, the report includes total elapsed time from first start event to last stop event. In other embodiments, the report includes one or more sequences of playback events, where each sequence begins with a start event and ends with a stop event, and each event includes a time. Such a sequence may include additional intermediate events such as pause, etc. To illustrate the difference, consider a scenario in which the user starts playback at 1 PM, ends playback at 2 PM, starts playback again at 3 PM, and stops playback at 4 PM. A report generated by the second embodiment includes only the total elapsed time from first start to last stop: elapsed=3:00. In contrast, a report generated by the first embodiment includes two sequences: start@1 PM-stop@2 PM; start@3 PM-stop@4 PM.

Figure 3:
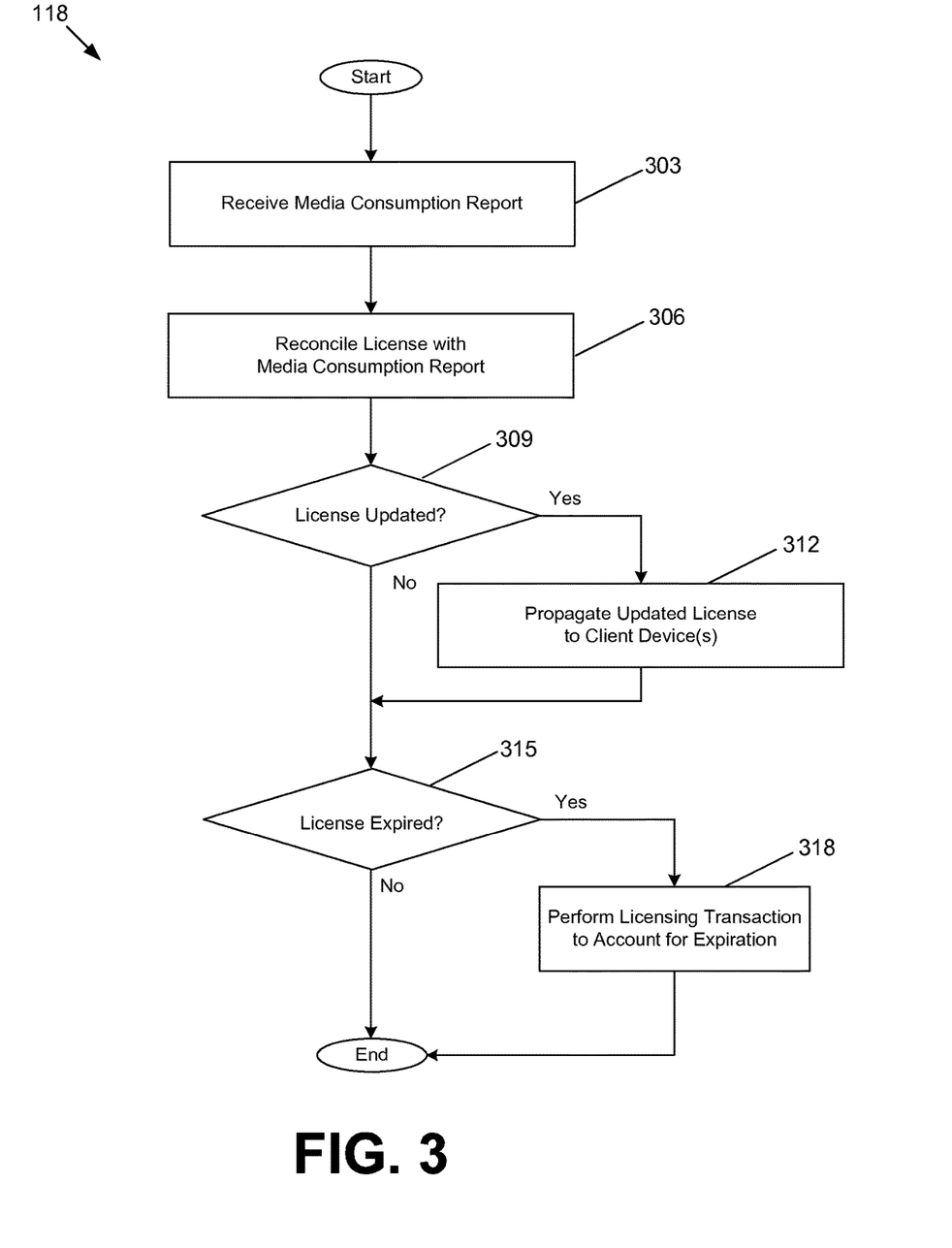
FIG. 3 is a flowchart illustrating one example of functionality implemented as portions of a media consumption tracker application executed in a computing device in the networked environment of FIG. 1 according to various embodiments of the present disclosure.

Turning now to FIG. 3, shown is a flowchart that provides one example of the operation of a portion of the media consumption tracker 118 according to various embodiments. It is understood that the flowchart of FIG. 3 provides merely an example of the many different types of functional arrangements that may be employed to implement the operation of the portion of the media consumption tracker 118, as described herein. As an alternative, the flowchart of FIG. 3 may be viewed as depicting an example of steps of a method implemented in the computing device 103 (FIG. 1) according to one or more embodiments.

Beginning at box 303, the media consumption tracker 118 receives a media consumption report from a media consumption reporter 130 executing on the client device 106. The media consumption report identifies the media title and the user account, such that the report is tied to a particular user's download of a particular title. The report may also identify the consuming device. The media consumption report also includes a start time for the reported client playback event.

Next, at box 306, the media consumption tracker 118 reconciles the local master license stored on the computing device 103 with the information in the received report. Reconciliation involves comparing an event time in the media consumption report with the rights window specified in the license. The rights window describes the window of time for which a licensor has agreed to license the media title. The rights window may be described, for example, in terms of a start time and a duration, by a start time and a stop time, etc. The rights window is updated as the media title is consumed on different client devices, which may involve modifying the start time and/or the duration in the rights window. For example, if the start time in the media consumption report is earlier than the start time in the rights window, the start of the rights window is changed to the value in the media consumption report. If the start time in the media consumption report is the same as or later than the rights window, then no reconciliation is needed and the license is not updated.

At box 309 the media consumption tracker 118 determines whether or not the license was updated by the reconciliation in box 306. If box 309 determines that the license was updated, then processing continues to box 312. If box 309 determines that the license was not updated, then processing continues to box 315.

At box 312, having determined that the license was updated, the media consumption tracker 118 propagates the updated license to one or more of the devices associated with the download. This allows for proper licensing behavior when the user has the right to download a media title to more than one device, as described earlier in the usage scenario. Propagation may use a "push" model where the media consumption tracker 118 actively sends the updated license to the client devices. Propagation may use a "pull" model where the media consumption tracker 118 waits for the client device to ask for license validation and provides the updated license as part of the validation. Propagation may also use a hybrid model where the media consumption tracker sends a notification to the client device, and that event causes the client device to request an updated license and/or license validation. After propagation, processing then continues at box 315.

At box 315 (which is optional) the media consumption tracker 118 uses the information in the media consumption report to determine if reconciled license has expired. Expiration is determined by comparing the start time in the media consumption report to the end of the rights window in the license. If the start time is outside of the rights window (past the end), the license has expired. If box 315 indicates that the license has not expired, then the process of FIG. 3 is complete. If box 315 indicates that the license has expired, then processing continues at box 318, where the media consumption tracker 118 contacts a system operated by the licensor and conducts a licensing transaction to account for the expiration, e.g., pays an additional fee for an extension of time. The process of FIG. 3 is then complete.

Figure 4:
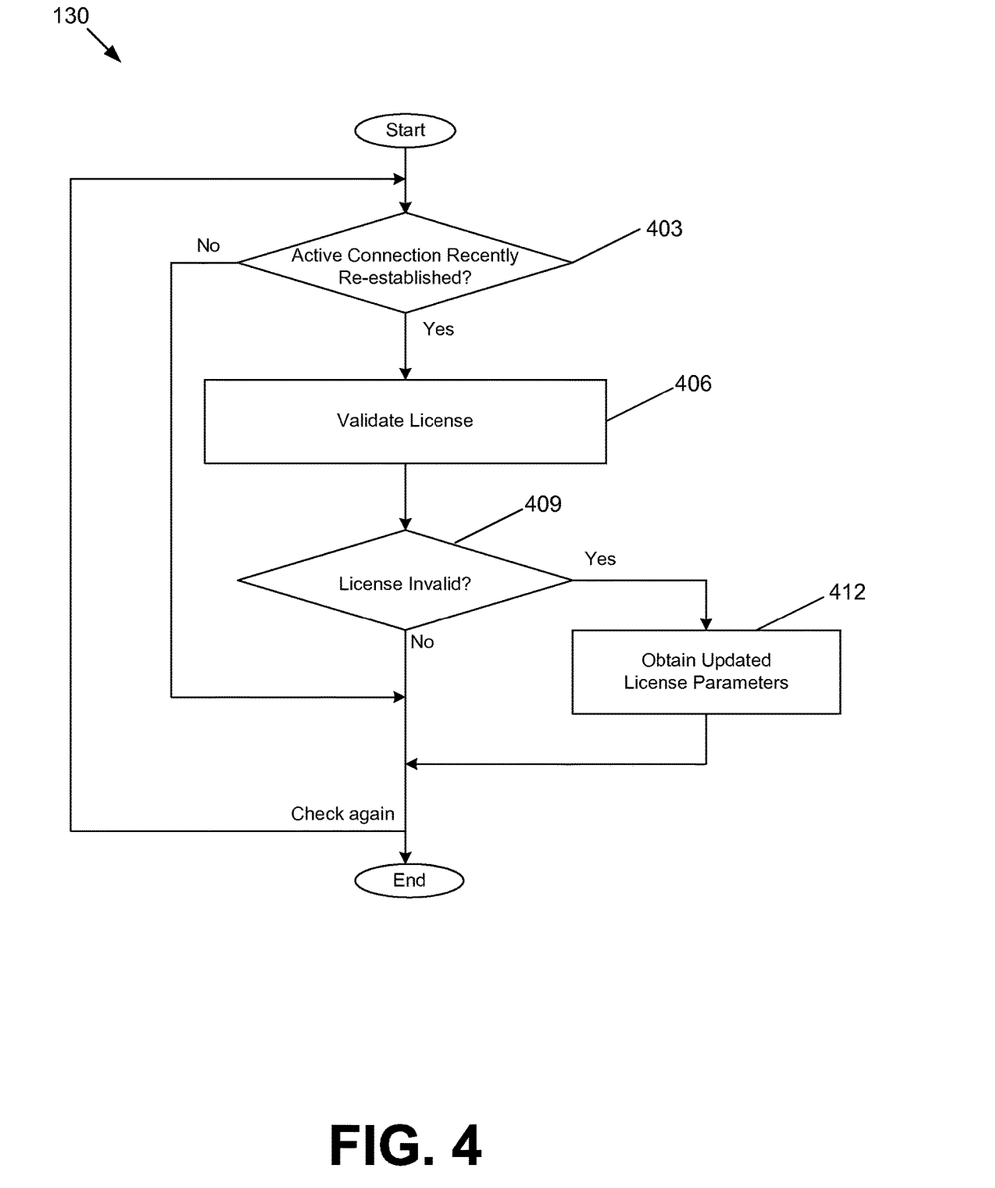
FIG. 4 is a flowchart illustrating another example of functionality implemented as portions of a media consumption reporter application executed in a client device in the networked environment of FIG. 1 according to various embodiments of the present disclosure.

Moving on to FIG. 4, shown is a flowchart that provides another example of the operation of a portion of the media consumption reporter 130 according to various embodiments. It is understood that the flowchart of FIG. 4 provides merely an example of the many different types of functional arrangements that may be employed to implement the operation of the portion of the media consumption reporter 130 as described herein. As an alternative, the flowchart of FIG. 4 may be viewed as depicting an example of steps of a method implemented in the client device 106 (FIG. 1) according to one or more embodiments.

Beginning at box 403, the media consumption reporter 130 determines whether the client device 106 has recently re-established an active connection to the network 109 (FIG. 1). If in box 403 it is determined that an active connection is not present, or is present but has not been recently re-established, the process of FIG. 4 loops to check for a re-established active connection at a later time. If in box 403 it is determined that an active connection has been recently re-established, processing moves to box 406. In box 406, the media consumption reporter 130 requests validation from the media consumption tracker 118 (FIG. 1) executing on the computing device 103. The media consumption tracker 118 will validate the locally stored license on the client device 106 against the master license managed by the media consumption tracker 118. At box 409, the media consumption reporter 130 determines whether the response to the validation request indicates that the license is invalid. If in box 409 it is determined that the license is invalid, then in box 412 the media consumption reporter 130 obtains an updated license (either from the response to the validation, or by making a separate query). The process of FIG. 4 then loops to check for a re-established active connection at a later time.

The following example further explains the process of FIG. 4. Suppose that the client device 106 has downloaded title X, and that the playback period for this title has not yet expired. Further suppose that during the time that the client device 106 was not actively connected to the network 109, another device on the same user account sent a media consumption report to the media consumption tracker 118 indicating that title X was played back for three hours. In this case, the media consumption tracker 118 would respond to the query at box 403 by sending an updated license with a reduced value for the once-started parameter.

Figure 5:
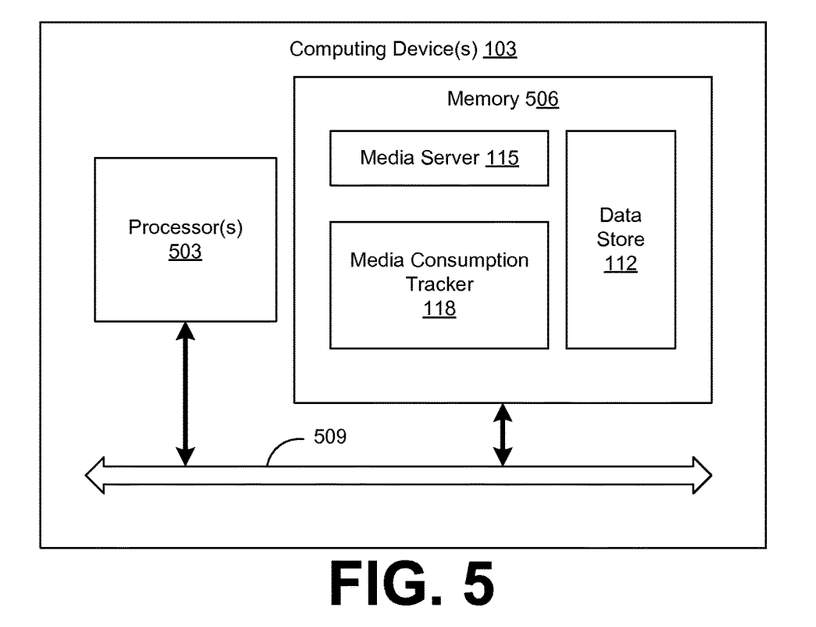
FIG. 5 is a schematic block diagram that provides one example illustration of a computing device employed in the networked environment of FIG. 1 according to various embodiments of the present disclosure.

Referring next to FIG. 5, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure, as can be appreciated.

Stored in the memory 506 are both data and several components that are executable by the processor 503. In particular, stored in the memory 506 and executable by the processor 503 are the media server 115, the media consumption tracker 118 and potentially other applications. Also stored in the memory 506 may be a data store 112 and other data. In addition, an operating system may be stored in the memory 506 and executable by the processor 503.

Figure 6:
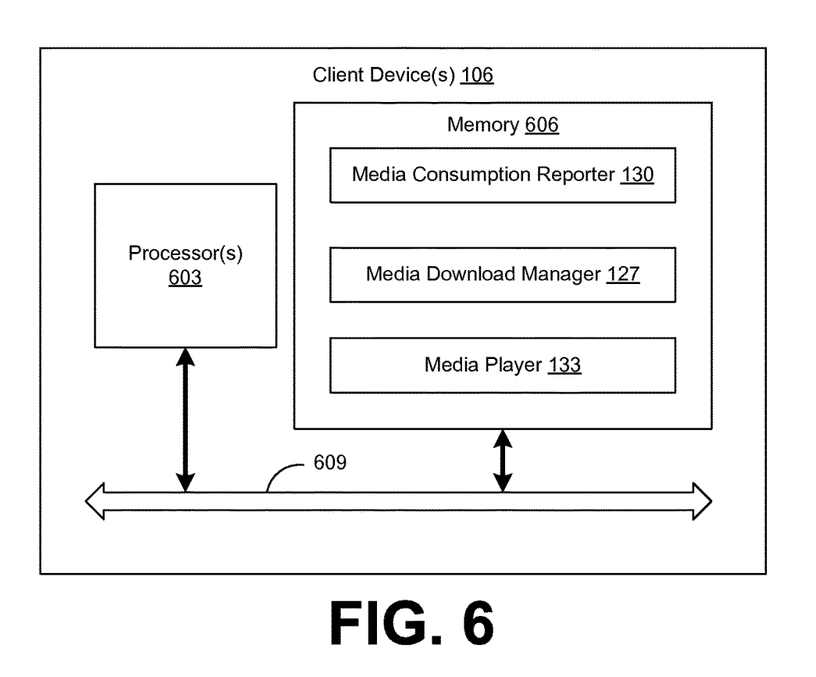
FIG. 6 is a schematic block diagram that provides another example illustration of a computing device employed in the networked environment of FIG. 1 according to various embodiments of the present disclosure.

Turning now to FIG. 6, shown is a schematic block diagram of the client device 106 according to an embodiment of the present disclosure. The client device 106 includes at least one processor circuit, for example, having a processor 603 and a memory 606, both of which are coupled to a local interface 609. To this end, the client device 106 may comprise, for example, at least one server computer or like device. The local interface 609 may comprise, for example, a data bus with an accompanying address/control bus or other bus structure, as can be appreciated.

Stored in the memory 606 are both data and several components that are executable by the processor 603. In particular, stored in the memory 606 and executable by the processor 603 are the media download manager 127, the media player 133, the media consumption reporter 130 and potentially other applications. In addition, an operating system may be stored in the memory 606 and executable by the processor 603.

It is understood that there may be other applications that are stored in the memory 506, 606 and are executable by the processors 503, 603 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 506, 606 and are executable by the processor 503, 603. In this respect, the term "executable" means a program file that is in a form that can ultimately be run by the processor 503, 603. Examples of executable programs may be, for example, a compiled program that can be translated into machine code in a format that can be loaded into a random access portion of the memory 506, 606 and run by the processor 503, 603, source code that may be expressed in proper format such as object code that is capable of being loaded into a random access portion of the memory 506, 606 and executed by the processor 503, 603, or source code that may be interpreted by another executable program to generate instructions in a random access portion of the memory 506, 606 to be executed by the processor 503, 603, etc. An executable program may be stored in any portion or component of the memory 506, 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506, 606 is defined herein as including both volatile and nonvolatile memory and data storage components. Volatile components are those that do not retain data values upon loss of power. Nonvolatile components are those that retain data upon a loss of power. Thus, the memory 506, 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503, 603 may represent multiple processors and the memory 506, 606 may represent multiple memories that operate in parallel processing circuits, respectively. In such a case, the local interface 509, 609 may be an appropriate network 109 (FIG. 1) that facilitates communication between any two of the multiple processors 503, 603, between any processor 503, 603 and any of the memories 506, 606, or between any two of the memories 506, 606, etc. The local interface 509, 609 may comprise additional systems designed to coordinate this communication, including, for example, performing load balancing. The processor 503, 603 may be of electrical or of some other available construction.

Although the media server 115, the media download manager 127, the media player 133, the media consumption reporter 130, the media consumption tracker 118, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2-4 show the functionality and operation of an implementation of portions of the media consumption reporter 130 and the media consumption tracker 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503, 603 in a computer system or other system. The machine code may be converted from the source code, etc. If embodied in hardware, each block may represent a circuit or a number of interconnected circuits to implement the specified logical function(s).

Although the flowcharts of FIGS. 2-4 show a specific order of execution, it is understood that the order of execution may differ from that which is depicted. For example, the order of execution of two or more blocks may be scrambled relative to the order shown. Also, two or more blocks shown in succession in FIGS. 2-4 may be executed concurrently or with partial concurrence. Further, in some embodiments, one or more of the blocks shown in FIGS. 2-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the media server 115, the media download manager 127, the media player 133, the media consumption reporter 130, and the media consumption tracker 118, that comprises software or code can be embodied in any non-transitory computer-readable medium for use by or in connection with an instruction execution system such as, for example, a processor 503, 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   a first computing device comprising a processor and a memory; and
   an application comprising machine readable instructions stored in the memory that, when executed by the processor, cause the first computing device to at least:
   detect a playback of a media item located on the first computing device associated with a user;
   determine that the playback of the media item is a continuation of a prior playback of the media item, wherein the prior playback of the media item was previously initiated on a second computing device associated with the user;
   determine an active connection to a network is present;
   responsive to determining that the active connection to the network is present, send a media consumption report over the network to a media consumption tracker at a central server, wherein the media consumption report comprises data related to the playback of the media item and wherein the media consumption tracker tracks consumption of the media item across the first and second computing devices with respect to a license of the user that is associated with the media item;

responsive to determining that the active connection to the network is present, request a validation of a copy of the license associated with the media item and stored on the first computing device against a master copy of the license that is stored on the central server; and continue the playback of the media item on the first computing device in response to receiving the validation of the copy of the license that is stored on the first computing device.

2. The system of claim 1, wherein the application further comprises machine readable instructions stored in the memory that, when executed by the processor, cause the first computing device to at least request an updated license over the network from the media consumption tracker.

3. The system of claim 1, wherein the machine readable instructions that cause the first computing device to send the media consumption report further cause the first computing device to at least delay sending the media consumption report until an active connection to the network is present.

4. The system of claim 1, wherein a time of the playback of the media item is included in the media consumption report.

5. The system of claim 1, wherein the validation of the license is based at least in part on the media consumption report.

6. The system of claim 1, wherein the license comprises a rights window specifying a time period during which the playback of the media item is permitted.

7. A non-transitory computer-readable medium embodying machine readable instructions that, when executed by a processor of a first computing device cause the first computing device to at least:

determine that a playback on a first computing device of a media item is a continuation of a prior playback of the media item, wherein the first computing device is associated with a user and the prior playback of the media item was previously initiated on a second computing device associated with the user;

obtain, by a central server over a network from the first computing device, a media consumption report comprising data for the playback of the media item by the first computing device;

compare, by the central server, a copy of a license of the user corresponding to the media item that is stored on the first computing device against a master copy of the license of the user corresponding to the media item that is stored at the central server;

determine, by the central server, that a the copy of the license of the user corresponding to the media item is invalid with respect to the first computing device and the playback of the media item;

determine that an active connection to the network is present between the central server and the first computing device; and responsive to determining that the active connection to the network is present between the central server and the first computing device, send, by the central server to the first computing device, an updated copy of the license corresponding to the media item, thereby allowing for the playback of the media item to continue on the first computing device.

8. The non-transitory computer-readable medium of claim 7, wherein at least one of a time of the playback, an identifier of the media item, or an identifier of the first computing device is included in the media consumption report.

9. The non-transitory computer-readable medium of claim 7, wherein the updated license is based at least in part on the media consumption report.

10. The non-transitory computer-readable medium of claim 7, further comprising machine readable instructions that cause the first computing device to at least determine that the playback of the media item complies with a condition of the updated license.

11. A method comprising:

determining, via a computing device associated with a user, that a playback for a media item located on the computing device associated with the user is a continuation of a prior playback for the media item, wherein the prior playback for the media item was previously initiated on another computing device associated with the user;

determining that an active connection to a network is present;

responsive to determining that the active connection to the network is present, requesting, via the computing device associated with the user from a central server, a validation of a copy of a license associated with the media item and stored on the computing device associated with the user;

determining, via the computing device, that the playback of the media item complies with a condition of a validated license stored on the computing device, wherein the license specifies a limit to an amount of consumption of the media item across the computing devices associated with the user;

continuing, via the computing device associated with the user, the playback for the media item on the computing device in response to determining that the playback of the media item complies with the condition of the validated license; and sending a media consumption report to a media consumption tracker at the central server.

12. The method of claim 11, wherein the media consumption report comprises at least one of an identifier of the computing device, an identifier of the media item, or event information related to the media item.

13. The method of claim 11, wherein validation of the license is based at least in part on the media consumption report.

* * * * *